United States Patent
Balakrishnan

(10) Patent No.: US 7,489,491 B2
(45) Date of Patent: Feb. 10, 2009

(54) METHOD AND APPARATUS FOR FAULT CONDITION PROTECTION OF A SWITCHED MODE POWER SUPPLY

(75) Inventor: Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 11/732,612

(22) Filed: Apr. 3, 2007

(65) Prior Publication Data

US 2007/0188960 A1 Aug. 16, 2007

Related U.S. Application Data

(63) Continuation of application No. 10/850,487, filed on May 19, 2004, now Pat. No. 7,218,495, which is a continuation of application No. 10/435,152, filed on May 8, 2003, now Pat. No. 6,788,514, which is a continuation of application No. 10/092,601, filed on Mar. 8, 2002, now Pat. No. 6,580,593.

(60) Provisional application No. 60/275,962, filed on Mar. 14, 2001.

(51) Int. Cl.
*H02H 3/06* (2006.01)
*H02H 3/00* (2006.01)

(52) U.S. Cl. .................... 361/93.4; 361/71; 361/75

(58) Field of Classification Search ............... 361/93.4, 361/71, 75
See application file for complete search history.

(56) References Cited

U.S. PATENT DOCUMENTS

| 4,266,259 | A | | 5/1981 | Howell |
| 4,394,703 | A | | 7/1983 | Butcher |
| 4,685,020 | A | | 8/1987 | Driscoll et al. |
| 4,761,702 | A | | 8/1988 | Pinard |
| 4,845,594 | A | * | 7/1989 | Wilkerson ............... 361/71 |
| 4,887,199 | A | | 12/1989 | Whittle |
| 4,916,573 | A | | 4/1990 | Ruta |
| 5,264,782 | A | | 11/1993 | Newton |
| 5,311,392 | A | * | 5/1994 | Kinney et al. ............ 361/93.2 |
| 5,335,162 | A | * | 8/1994 | Martin-Lopez et al. ....... 363/97 |
| 5,510,699 | A | | 4/1996 | Theus et al. |

(Continued)

FOREIGN PATENT DOCUMENTS

EP 02251781 10/2002

(Continued)

OTHER PUBLICATIONS

Bindra, A., "Power-Conversion Chip Cuts Energy Wastage In Off-Line Switchers," *Electronic Design*, pp. 46, 48, Oct. 1998.

*Primary Examiner*—Stephen W Jackson
*Assistant Examiner*—Scott Bauer
(74) *Attorney, Agent, or Firm*—Blakely Sokoloff Taylor & Zafman LLP

(57) ABSTRACT

Methods and apparatuses for fault condition protection of a switched mode power supply. In one aspect of the invention, a power supply circuit having an auto-restart function to turn the power supply on and off repeatedly under fault conditions is included. In one embodiment, one or more off-times following detection of a fault condition is smaller than subsequent off-times.

12 Claims, 4 Drawing Sheets

U.S. PATENT DOCUMENTS

| | | |
|---|---|---|
| 5,550,437 A | 8/1996 | Hopkins et al. |
| 5,698,970 A | 12/1997 | Stanojevic |
| 5,747,978 A | 5/1998 | Gariboldi et al. |
| 5,796,596 A | 8/1998 | Williams |
| 5,798,635 A | 8/1998 | Hwang et al. |
| 5,805,401 A | 9/1998 | Schuellein et al. |
| 5,874,841 A | 2/1999 | Majid et al. |
| 5,949,154 A | 9/1999 | Williams |
| 6,147,883 A | 11/2000 | Balakrishnan et al. |
| 6,154,377 A | 11/2000 | Balakrishnan et al. |
| 6,239,960 B1 * | 5/2001 | Martin ........................ 361/86 |
| 6,580,593 B2 | 6/2003 | Balakrishnan |
| 2001/0043091 A1 | 11/2001 | Hall et al. |

FOREIGN PATENT DOCUMENTS

| | | |
|---|---|---|
| JP | 60-167014 | 8/1985 |
| JP | 04-2999019 | 10/1992 |
| JP | 2000-324817 | 11/2000 |

* cited by examiner

METHOD AND APPARATUS FOR FAULT CONDITION PROTECTION OF A SWITCHED MODE POWER SUPPLY

REFERENCE TO PRIOR APPLICATION

This application is a continuation of U.S. application Ser. No. 10/850,487, filed May 19, 2004, now U.S. Pat. No. 7,218, 495 now pending, which is a continuation of U.S. application Ser. No. 10/435,152, filed May 8, 2003, now U.S. Pat. No. 6,788,514, which is a continuation of U.S. application Ser. No. 10/092,601, filed Mar. 8, 2002, now U.S. Pat. No. 6,580, 593, which claims the benefit of U.S. provisional application Ser. No. 60/275,962, filed Mar. 14, 2001, entitled "Method And Apparatus For Fault Condition Protection Of A Switched Mode Power Supply."

BACKGROUND OF THE INVENTION

1. Field of the Invention

The present invention relates generally to power supplies and, more specifically, the present invention relates to a switching regulator.

2. Background Information

In a switching power supply, a power supply controller is connected in series with a primary winding of a transformer to the high voltage direct current (DC) input derived from alternating current (AC) power line through rectification and filtering. Energy is transferred to the secondary winding in a manner controlled by the power supply controller so as to provide a constant output voltage. Another winding called a feedback or bias winding may be used to provide a feedback signal to the power supply controller. Alternatively, the feedback signal can come through an opto-coupler from a sense circuit at the secondary output. The feedback signal is used to modulate the duty cycle of the power supply controller or used to allow or disallow cycles in order to control the secondary output.

In the event of a short circuit condition, an overload condition (may be caused by either an overload at the output secondary winding or an under voltage condition at the power supply input) or an open in the feedback loop, the power supply controller detects the loss of feedback signal and goes into a mode called "auto-restart." In the auto-restart mode, the power supply controller tries to start the power supply periodically by delivering power for a period of time, also known as the on-time, (greater than needed for start up) and turns off the power supply for another period of time, also known as the off-time. As long as the fault condition is present, the power supply controller remains in this auto-restart mode limiting the average output power to a safe, low value. When the fault is removed, auto-restart enables the power supply to start automatically.

The operating principle of auto-restart is to reduce the average power delivered to the power supply output during fault condition to a safe level by running the power supply alternately between a first predetermined time period (also known as on-time) and a second predetermined time period (also known as off-time). During on-time power supply is on delivering energy to output while during off-time power supply is off delivering no energy to output. To make auto-restart protection effective, the off-time is set significantly longer than the on-time. When fault condition occurs for a duration shorter than the auto-restart off-time, the power supply will not attempt to restart until the off-time is over resulting in unnecessary long delay before recovery.

SUMMARY OF THE INVENTION

Methods and apparatuses for fault condition protection of a switched mode power supply are disclosed. In one aspect of the invention, a power supply circuit having an auto-restart function to turn the power supply on and off repeatedly under fault conditions is included. In one embodiment, one or more off-times following detection of a fault condition is smaller than subsequent off-times. Additional features and benefits of the present invention will become apparent from the detailed description and figures set forth below.

BRIEF DESCRIPTION OF THE DRAWINGS

The present invention detailed is illustrated by way of example and not limitation in the accompanying figures.

DETAILED DESCRIPTION

Figure 1:
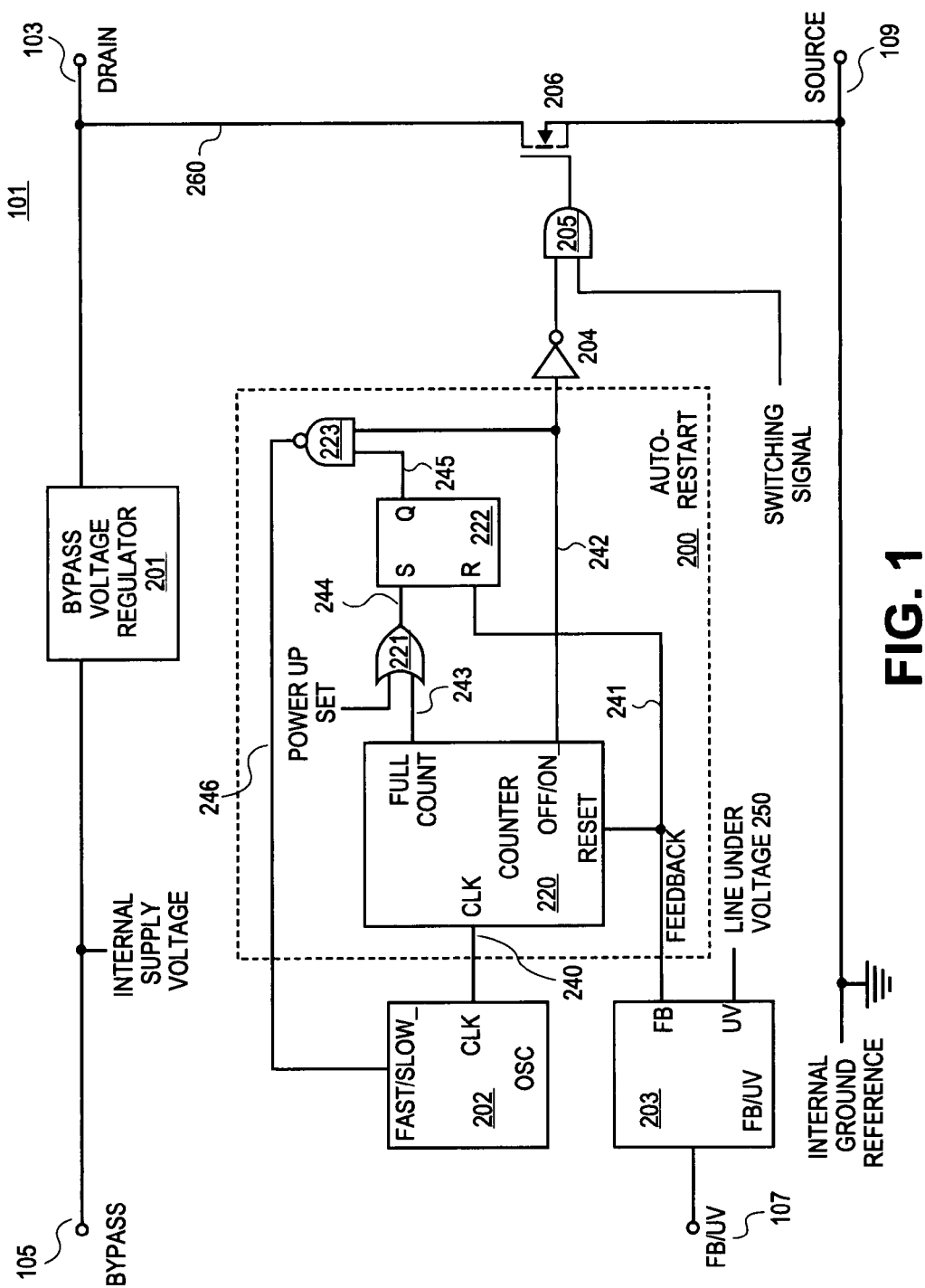
FIG. 1 shows one embodiment of an integrated power supply controller circuit with improved fault condition protection in accordance with the teachings of the present invention.

Embodiments of methods and apparatuses for fault condition protection of a switched mode power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview, embodiments of the present invention provide improved fault condition protection for power supplies against faults that leads to open control loop conditions. In the various embodiments disclosed, a fault condition in the power supply may result from an open loop condition, which may be a result of a power supply output short circuit condition or a power supply overload condition. In one embodiment, the power supply overload condition may be a result of a power supply input under-voltage condition. In one embodiment, the off-time or the duration of a disable period of the initial auto-restart cycle or cycles is shortened significantly compared to the off-time or the duration of disable periods of subsequent auto-restart cycles. For faults with short duration, the recovery time of the power supply is reduced due to the shortened off-time of the initial auto-restart cycle or cycles.

For faults persisting over longer durations, the protection provided by the auto-restart for a power supply in accordance with the teachings of the present invention is not compromised as, except for the auto-restart cycle or cycles, the off-time of subsequent cycles are not shortened.

As will be discussed, in one embodiment, a fixed number of auto-restart cycles are shortened after the detection of a fault condition and the subsequent auto-restart cycles have longer durations. In one embodiment, the fault condition is not detected until after the power supply has been in regulation. Only the first auto-restart cycle is shortened in one embodiment of the present invention. This modification allows a power supply to recover from momentary fault conditions with reduced delay. For example, in one embodiment, a power supply controller in accordance with the teachings of the present invention, the on-time is 50 ms and the off-time of the first auto-restart cycle is set to a much shorter value of, for example, 200 ms or four times of on-time while leaving the off-time of all subsequent auto-restart cycles unchanged (one second or twenty times of on-time in this case).

Accordingly, when a fault occurs, a power supply in accordance with the teachings of the present invention makes its first restart attempt in 200 ms and then, if not successful, follows up with one subsequent attempt every 1.05 seconds. This allows the power supply to recover quickly from a momentary fault condition without compromising the auto-restart protection against faults persisting over longer time duration. Of course, the values of these time durations are provided only for explanation purposes and other time durations may be employed in accordance with the teachings of the present invention.

In one embodiment, an implementation in accordance with the teachings of the present invention includes a switching device for controlling, regulating or modulating power delivered to the output and a timer coupled to the switching device and to the feedback signal. When a fault condition occurs, the timer enables the switching device to deliver power to the output for a first predetermined period (on-time), which is then followed by the timer disabling the switching device to prevent power delivery to the output for a second predetermined period (off-time). The switching device may be alternately enabled for the on-time and disabled for the off-time when the fault condition persists. This function is known as auto-restart. In one embodiment, the switching device may be a power transistor. The timer may be a digital counter. An oscillator with a predetermined frequency may be coupled to the counter. The oscillator may have a control input for selecting between two predetermined frequencies: one fast, one slow.

In one embodiment of steady state auto-restart operation, the off-time is much longer than the on-time, which in one embodiment is accomplished by running the oscillator at the fast frequency during on-time and at the slow frequency during off-time. The off-time of the first auto-restart cycle may be shortened by running the oscillator at the fast frequency instead of the default slow frequency. In one embodiment, the on-times use the fast frequency while the off-times except for the off-time of the first auto-restart cycle use the slow frequency.

In one embodiment, the on-time and off-time are controlled by a signal decoded from the counter output according to desired on-time to off-time ratio. At power up, counter is reset to zero count. On-time starts from zero count and ends at n count. Off-time starts from n+1 count and ends at full count. In order to use the fast frequency for the off-time of the first auto-restart cycle and slow frequency for the off-time of all subsequent cycles, a latch is added in one embodiment. The output of the latch determines which frequency is to be used for the off-time. The latch being set selects the slow frequency and the latch being reset selects the fast frequency. The on-time uses the fast frequency regardless of the state of the latch output.

In one embodiment, at power up, the latch is automatically set to select the slow frequency for the off-time. After the power supply output reaches regulation, a feedback signal is generated from the power supply output, which in turn resets the latch and changes the selection to the fast frequency. Consequently, when a fault condition occurs, auto-restart begins with a short cycle providing an opportunity for the power supply to recover quickly if the fault is short in duration. At the completion of the first auto-restart cycle, off-time ends and the counter reaches full count. A full count signal is then generated to set the latch and selects the slow frequency. This ensures the use of slow frequency for the off-time of subsequent cycles if auto-restart continues as a result of a persisting fault. Upon the removal of the fault, the power supply restarts and the output reaches regulation. A feedback signal is then generated, which once again resets the latch and selects the fast frequency. Notice that, at this point, the power supply is back to the same status as it was first time after power up. For faults with a short duration, this fault removal process happens at the end of the first auto-restart cycle and the recovery time is short. For faults with longer duration, this happens at the end of a later cycle but the process is the same.

To illustrate, FIG. 1 shows one embodiment of an integrated power supply controller circuit 101. A BYPASS voltage regulator 201 is connected to both the DRAIN terminal 103 and the BYPASS terminal 105 to generate a stable voltage for internal supply use. A FB/UV circuit 203 is coupled to the FB/UV terminal 107 to receive a combined feedback and line voltage signal. The FB/UV circuit 203 checks line under voltage and separates the combined signal into a feedback signal 241 and a line under voltage signal 250. An auto-restart circuit 200 consists of a counter 220, an OR gate 221, an RS latch 222 and an NAND gate 223. In one embodiment, feedback signal 241 is a digital signal having two states.

In one embodiment, the counter 220 receives a clock signal 240 from an oscillator 202 and generates an OFF/ON_signal 242 to control the on-time and the off-time of the auto-restart operation. At power up, latch 222 is set before counting begins, and counter 220 is reset before counting begins. The OFF/ON_signal 242 stays low from zero count up to n count indicating auto-restart on-time. The OFF/ON_signal 242 goes high at n count and stays high till full count indicating auto-restart off-time. A full count signal 243 is generated at full count, which sets the latch 222 via OR gate 221.

As shown in the depicted embodiment, the latch output 245 is coupled to one input of NAND gate 223. The other input of the NAND gate 223 receives the OFF/ON_signal 242 from counter 220. The output of NAND gate 223 connects to the FAST/SLOW_input of oscillator 202. A high signal at the FAST/SLOW_input selects the predetermined fast frequency for the oscillator 202 while a low signal selects the predetermined slow frequency. When latch 222 is reset, the signal at the FAST/SLOW_input (signal 246) is forced high by NAND gate 223. This forces the off-time to run the same frequency as the on-time (fast frequency). When latch 222 is set, the signal at the FAST/SLOW_input is equal to the OFF/ON_signal 242 which allows the off-time to run the opposite frequency as the on-time (slow frequency).

As shown in the depicted embodiment, the FB/UV circuit 203 receives a combined feedback and a line voltage signal from the FB/UV terminal 107. After separating the feedback signal from line voltage signal, FB/UV circuit 203 sends the FEEDBACK signal 241 to the RESET input of counter 220 and R input of latch 222. When power supply output reaches regulation, node 241 goes high resetting both counter 220 and latch 222. The OFF/ON_signal is also coupled to the input of the other AND gate 205 through inverter 204. The power MOSFET 206 or power switch coupled between DRAIN terminal 103 and SOURCE terminal 109 is disabled when OFF/ON_signal is high (auto-restart off-time) and enabled when OFF/ON_is low (auto-restart on-time).

Figure 2:
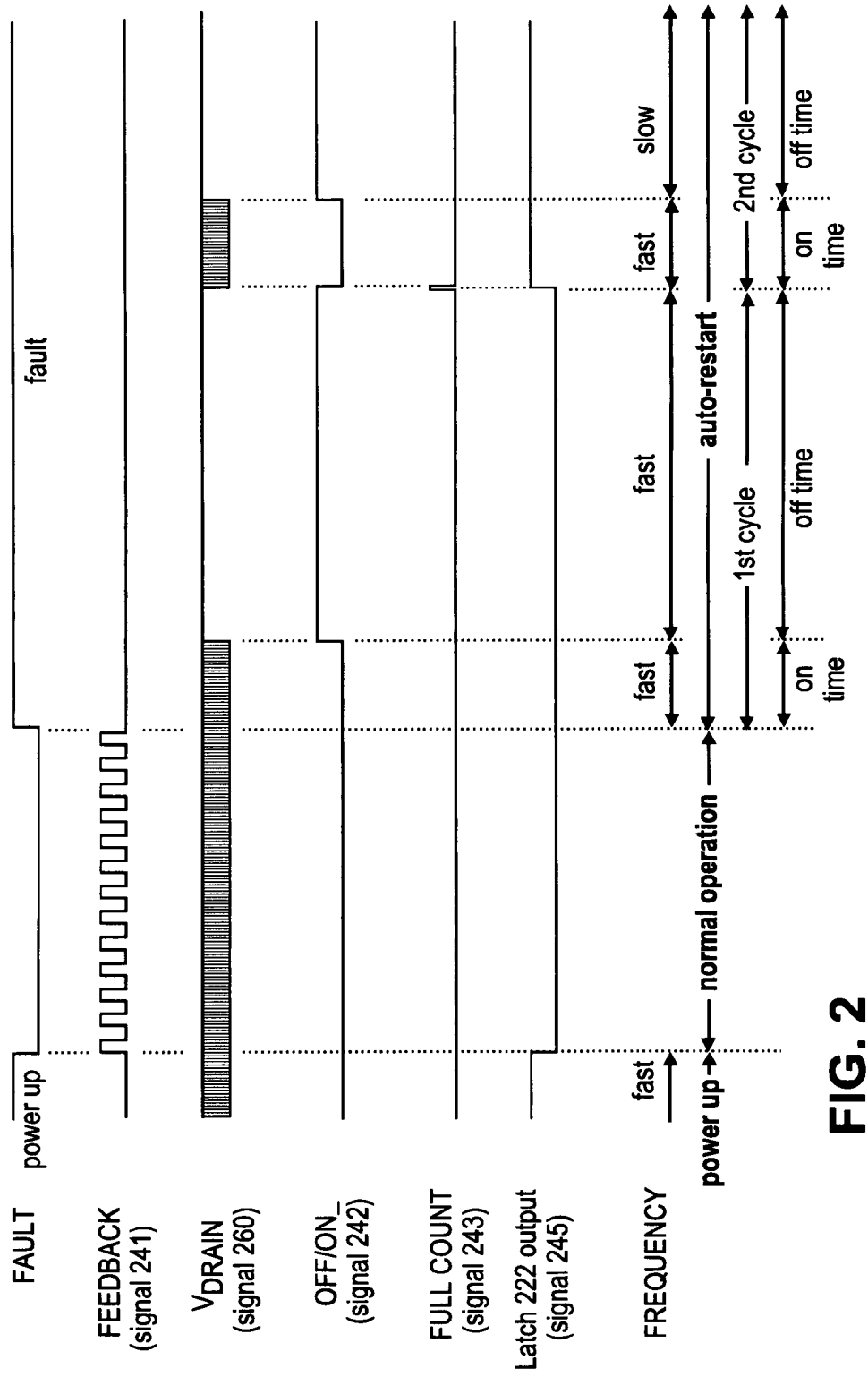
FIG. 2 is a timing diagram showing one embodiment of power up, normal operation and auto-restart in a power supply controller in accordance with the teachings of the present invention.

FIG. 2 shows various modes of operation for one embodiment of a switched mode power supply with an auto-restart function in accordance with the teachings of the present invention. As can be seen, when a fault occurs after power supply reaches regulation, FEEDBACK signal 241 goes low, the power supply continues switching for a duration of the auto-restart on-time. The maximum available power is delivered to power supply output during this period. If FEEDBACK signal 241 stays low during this time, a fault condition is detected at the end of this period and the first auto-restart off-time begins. Because the fast frequency is selected, this first cycle of the off-time is short compare to subsequent off-times. Thus, the fault condition is detected in one embodiment after the FEEDBACK signal 241 has been idle or has not changed states for a predetermined period of time.

Figure 3:
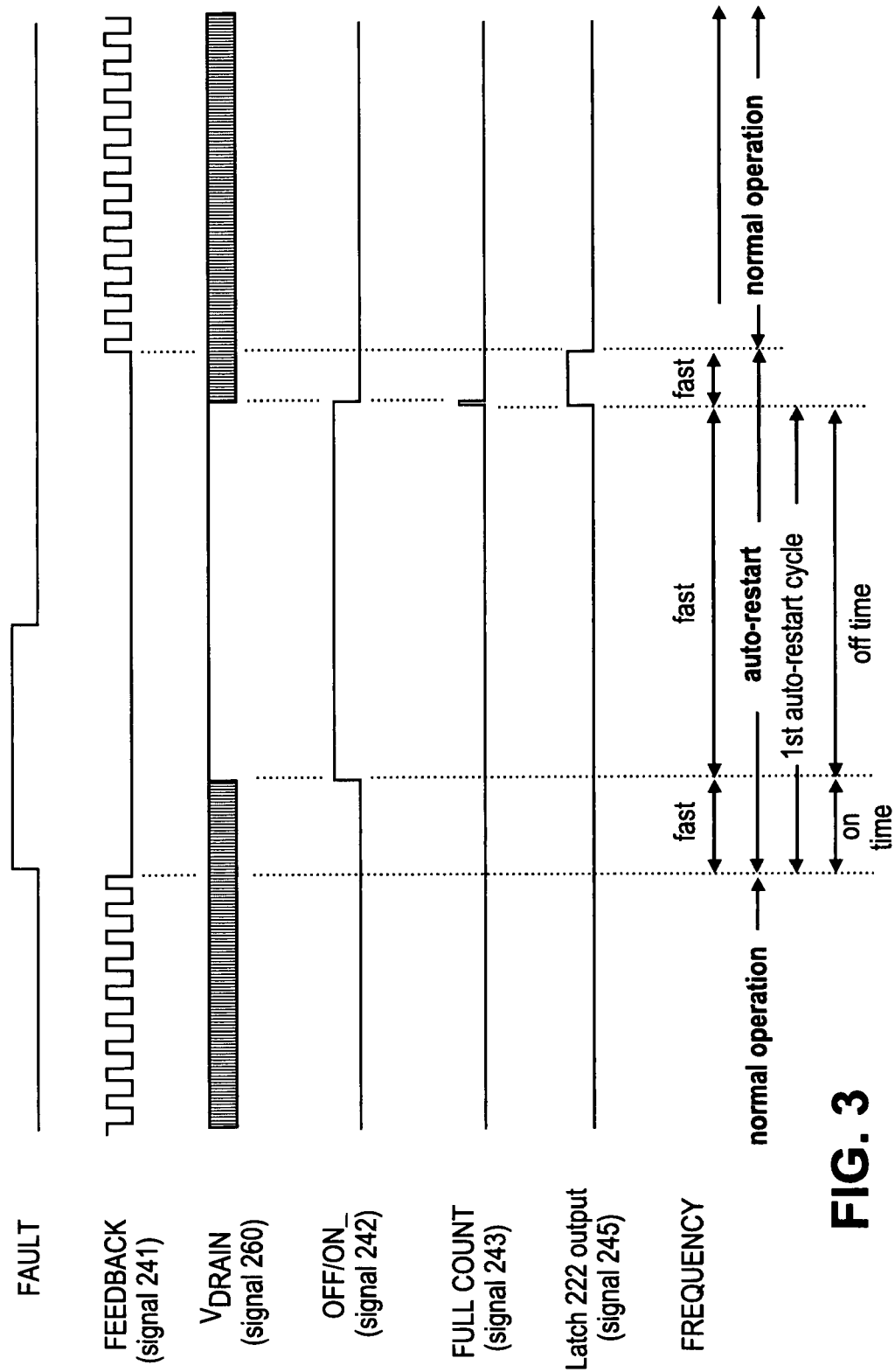
FIG. 3 is a timing diagram showing one embodiment of momentary fault recovery in a power supply controller in accordance with the teachings of the present invention.

FIG. 3 illustrates the fast recovery of one embodiment of a power supply in accordance with the teachings of the present invention from a momentary fault. In accordance with the embodiment described above, the frequency is shown as fast for the first auto-restart cycle and slow for the second auto-restart cycle, only the beginning of which is shown. For any fault with a duration shorter than the sum of the first auto-restart cycle and the on-time of the second auto-restart cycle, the power supply reaches regulation and resets latch 222 before the second off-time begins.

Figure 4:
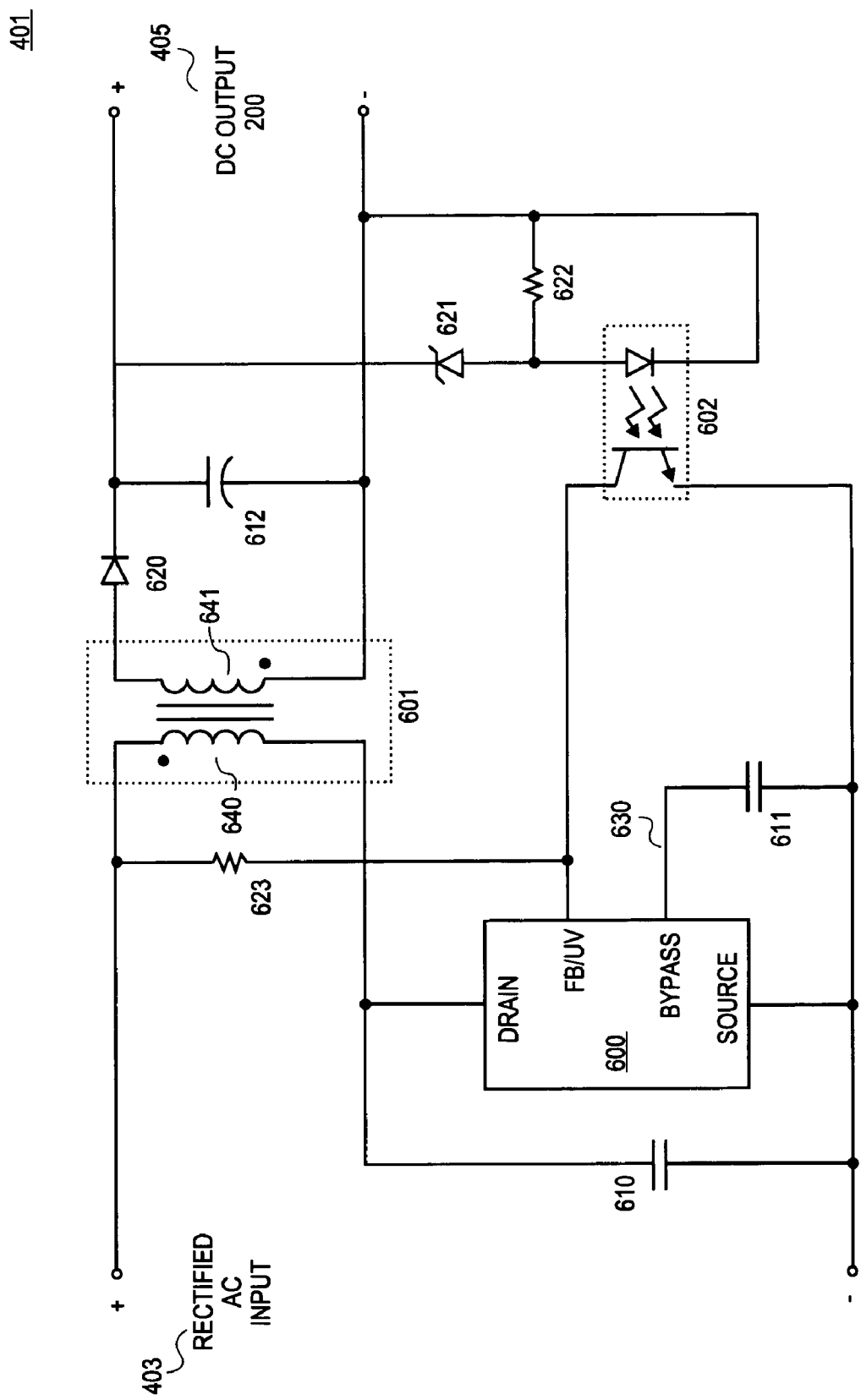
FIG. 4 shows one embodiment of a switched mode power supply in accordance with teachings of the present invention.

FIG. 4 shows one embodiment of a switched mode power supply 401 with an input for receiving energy from a rectified and filtered AC input 403 and a DC output 405 for generating a regulated DC voltage. As shown in the depicted embodiment, power supply 401 includes a power supply controller 600 coupled to an energy transfer element 601. In one embodiment, power supply controller 600 is an integrated circuit including four terminals: BYPASS, FB/UV, DRAIN and SOURCE. The energy transfer element is a transformer with a primary winding 640 and a secondary winding 641. In one embodiment, energy transfer element 601 includes a transformer, coupled inductors, an inductor or the like. Output voltage is sensed by Zener diode 621 and an LED of an opto-coupler 602. The feedback signal generated from the secondary winding 641 is coupled back to the FB/UV terminal of the power supply controller 600 via the opto-coupler 602. An on-chip high voltage power MOSFET is switched on and off by the power supply controller 600 to control the transfer of energy from input 403 to output 405, and thus, regulating the output voltage according to the feedback signal.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A circuit, comprising:
  a switch to be coupled to an energy transfer element of a power supply and switched in response to a switching signal to regulate an output of the power supply;
  an oscillator to output a clock signal at a frequency selectable from among at least a first and a second frequency; and
  an auto-restart circuit coupled to the oscillator and to the switch to alternately enable and disable the switch during a fault condition of the power supply, wherein the auto-restart circuit is coupled to disable the switch for one or more disable periods each having a first duration responsive to the first frequency of the clock signal and to disable the switch for subsequent disable periods each having a second duration responsive to the second frequency of the clock signal, wherein the first duration is smaller than the second duration.

2. The circuit of claim 1, wherein the first frequency of the clock signal is higher than the second frequency of the clock signal.

3. The circuit of claim 2, wherein the oscillator outputs the clock signal at the first frequency during an initial disable period following a detection of the fault condition and wherein the oscillator outputs the clock signal at the second frequency during the subsequent disable periods.

4. The circuit of claim 2, wherein the auto-restart circuit is coupled to cause the oscillator to output the clock signal at the first frequency for at least one initial disable period following a detection of the fault condition.

5. The circuit of claim 4, wherein the auto-restart circuit is further coupled to cause the oscillator to output the clock signal at the second frequency for at least one subsequent disable period following the at least one initial disable period.

6. The circuit of claim 2, wherein the auto-restart circuit is coupled to cause the oscillator to output the clock signal at the first frequency for one or more enable periods.

7. The circuit of claim 2, wherein the auto-restart circuit comprises a first auto-restart cycle following a detection of the fault condition and a second auto-restart cycle following the first auto-restart cycle, wherein the oscillator outputs the clock signal at the first frequency during an enable and disable period of the first auto-restart cycle, and wherein the oscillator outputs the clock signal at the first frequency during an enable period of the second auto-restart cycle and at the second frequency during a disable period of the second auto-restart cycle.

8. The circuit of claim 1, wherein the fault condition is entered in response to an open loop condition.

9. The circuit of claim 8, wherein the open loop condition is in response to a condition selected from the group consisting of: a power supply output short circuit condition and a power supply overload condition.

10. The circuit of claim 9, wherein the power supply overload condition is in response to a power supply input undervoltage condition.

11. The circuit of claim 1, wherein a number of the one or more disable periods is a fixed number.

12. The circuit of claim 1, wherein detection of the fault condition of the power supply occurs after the power supply reaches regulation.

* * * * *